(12) United States Patent
Wang et al.

(10) Patent No.: US 10,225,849 B2
(45) Date of Patent: Mar. 5, 2019

(54) METHODS AND DEVICES FOR UPLINK SPS RELEASE

(71) Applicant: Telefonaktiebolaget LM Ericsson (publ), Stockholm (SE)

(72) Inventors: Jun Wang, Jiangsu (CN); Yingde Liu, Jiangsu (CN); Yong Yao, Jiangsu (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 87 days.

(21) Appl. No.: 15/509,262

(22) PCT Filed: Sep. 19, 2014

(86) PCT No.: PCT/CN2014/086956
§ 371 (c)(1),
(2) Date: Mar. 7, 2017

(87) PCT Pub. No.: WO2016/041203
PCT Pub. Date: Mar. 24, 2016

(65) Prior Publication Data
US 2017/0290030 A1    Oct. 5, 2017

(51) Int. Cl.
*H04W 72/12*       (2009.01)
*H04W 76/34*       (2018.01)
(Continued)

(52) U.S. Cl.
CPC .......... *H04W 72/12* (2013.01); *H04L 1/1812* (2013.01); *H04W 72/0413* (2013.01); *H04W 72/0446* (2013.01); *H04W 76/34* (2018.02)

(58) Field of Classification Search
CPC ............. H04W 72/12; H04W 72/0413; H04W 72/0446; H04W 76/064; H04W 76/34;
(Continued)

(56) References Cited

U.S. PATENT DOCUMENTS 8,682,371 B2 *   3/2014   Sagfors ................. H04W 28/18
                                                        370/329
2010/0151874 A1*  6/2010   Cai ....................... H04L 1/0039
                                                        455/452.1
(Continued)

FOREIGN PATENT DOCUMENTS

| CN | 101478371 | 7/2009 |
| CN | 103648169 | 3/2014 |
| EP | 2166804 A1 | 3/2010 |
| EP | 2744139 A1 | 6/2014 |
| WO | WO 2010077938 | 7/2010 |
| WO | WO 2010088680 A1 | 8/2010 |

OTHER PUBLICATIONS

PCT Notification of Transmittal of the International Search Report and the Written Opinion of the International Searching Authority, or the Declaration for International application No. PCT/CN2014/086956—dated Jun. 29, 2015.
(Continued)

*Primary Examiner* — Jung Liu
(74) *Attorney, Agent, or Firm* — Sage Patent Group

(57) ABSTRACT

One embodiment of the present disclosure relates to a method for uplink SPS release. The method for operating a network node device comprises: determining whether or not there is a dynamically scheduled uplink transmission for a communication device in an uplink sub-frame where the communication device needs to perform an uplink SPS release; sending to the communication device, in response to determining that there is a dynamically scheduled uplink transmission for the communication device in the uplink sub-frame where the communication device needs to perform an uplink SPS release, a dynamic scheduling DCI message for the dynamically scheduled uplink transmission. At least one field of the dynamic scheduling DCI message is configured in a manner that the dynamic scheduling DCI
(Continued)

implicitly indicates the uplink SPS release. The method further comprises sending to the communication device, in response to determining that there is no dynamically scheduled uplink transmission for the communication device in the uplink sub-frame where the communication device needs to perform an uplink SPS release, an uplink SPS release DCI message to explicitly indicate the uplink SPS release. According to an aspect of the present disclosure, there are provided corresponding methods and devices.

15 Claims, 7 Drawing Sheets

(51) Int. Cl.
  *H04L 1/18* (2006.01)
  *H04W 72/04* (2009.01)
(58) Field of Classification Search
  CPC .... H04W 72/04; H04L 1/1812; H04L 5/0035; H04L 5/0055; H04L 5/0057; H04L 12/2869; H04L 12/5695; H04L 47/00; H04L 47/70; H04L 47/78; H04L 47/821; H04L 47/827
  See application file for complete search history.

(56) References Cited

U.S. PATENT DOCUMENTS

| | | |
|---|---|---|
| 2010/0195629 A1 | 8/2010 | Chen et al. |
| 2013/0028212 A1* | 1/2013 | Lohr ................. H04W 72/042 370/329 |

OTHER PUBLICATIONS

Nokia Corporation et al, "Acknowledgement for explicit UL SPS release", 3GPP Draft; R2-091324, 3rd Generation Partnership Project (3GPP), Mobile Competence Centre ; 650, Route Des Lucioles ; F-06921 Sophia-Antipolis Cedex ; France, (Feb. 3, 2009), No. Athens, Greece; Feb. 3, 2009, XP050323373.

"3rd Generation Partnership Project; Technical Specification Group Radio Access Network; Evolved Universal Terrestrial Radio Access (E-UTRA); Physical layer procedures (Release 12)", 3GPP Standard; 3GPP TS 36213; 3rd Generation Partnership Project (3GPP), Mobile Competence Centre ; 650, Route Des Lucioles ; F-06921 Sophia-Antipolis Cedex ; France, (Jun. 30, 2014), vol. RAN WG1, No. V12.2.0, pp. 1-207, XP050774487.

"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, 3rd Generation Partnership Project (3GPP), Mobile Competence Centre ; 650, Route Des Lucioles ; F-06921 Sophia-Antipolis Cedex ; France, (Jun. 16, 2014), vol. RAN WG1, No. V12.2.0, pp. 1-121, XP050774046.

"3rd Generation Partnership Project; Technical Specification Group Radio Access Network; Evolved Universal Terrestrial Radio Access (E-UTRA); Multiplexing and channel coding (Release 12)", 3GPP Standard; 3GPP TS 36.212, 3rd Generation Partnership Project (3GPP), Mobile Competence Centre ; 650, Route Des Lucioles ; F-06921 Sopra-Antipolis Cedex ; France, (Jun. 17, 2014), vol. RAN WG1, No. V12.1.0, pp. 1-89, XP050774076.

Supplementary European Search Report—EP 14902072.9—dated Mar. 21, 2018—pp. 5.

* cited by examiner

METHODS AND DEVICES FOR UPLINK SPS RELEASE

PRIORITY

This nonprovisional application is a U.S. National Stage Filing under 35 U.S.C. § 371 of International Patent Application Ser. No. PCT/CN2014/086956 filed Sep. 19, 2014, and entitled "Methods And Devices For Uplink SPS Release".

TECHNICAL FIELD

The present disclosure generally relates to wireless communication, particularly to methods and devices for uplink SPS (Semi-Persistent Scheduling) release.

BACKGROUND

SPS (Semi-Persistent Scheduling) is a feature defined by the 3rd Generation Partnership Project that significantly reduces control channel overhead for QoS (Quality of Service) applications/services (VoLTE,VoiceoverLongTermEvolution) that require periodical radio resource allocations.

Procedures of semi-persistent scheduling and DCI formats are defined in 3GPP TS 36.213, Release 8, in which both SPS activation and release methods are specified.

According to the specification, the downlink SPS activation and release can be acknowledged by a communication device such as UE (User Equipment) through HARQ (Hybrid Automatic Repeat Request) feedback, such as ACK (acknowledgement)/NACK (negative acknowledgement) messages, on PUCCH (Physical Uplink Control Channel)/PUSCH (Physical Uplink Shared Channel), just like normal downlink dynamic scheduling.

According to the specification, uplink SPS activation can be also acknowledged through corresponding PUSCH transmission, just like normal UL dynamic scheduling.

However, as to uplink SPS release, 3GPP TS specifications just provide some constraints and do not specify a practical and effective procedure for both the notification and acknowledgment of uplink SPS release.

SUMMARY

One or more method and apparatus embodiments according to the present disclosure aim to provide one or more solutions for uplink SPS release procedure.

According to the first aspect of the present disclosure, there is provided a method for operating a network node device. The method comprises: determining whether or not there is a dynamically scheduled uplink transmission for a communication device in an uplink sub-frame where the communication device needs to perform an uplink SPS release. The method further comprises sending to the communication device, in response to determining that there is a dynamically scheduled uplink transmission in the uplink sub-frame where the communication device needs to perform an uplink SPS release, a dynamic scheduling DCI, Downlink Control Indication, message for the normal dynamic uplink transmission. At least one field of the dynamic scheduling DCI message is configured in a manner that the dynamic scheduling DCI implicitly indicates the uplink SPS release. The method further comprises: sending to the communication device, in response to determining that there is no dynamically scheduled uplink transmission in the uplink sub-frame where the communication device needs to perform an uplink SPS release, an uplink SPS release DCI message to explicitly indicate the uplink SPS release.

According to one or more embodiments of the first aspect of the present disclosure, in case that uplink SPS release DCI message is sent to explicitly indicate the uplink SPS release, the method may further comprise: determining the uplink SPS release state of the communication device based on whether a HARQ feedback from the communication device is carried on a PUCCH resource position, which is configured to implicitly indicate to the network node device a uplink SPS release acknowledgement.

According to the second aspect of the present disclosure, there is provided a method for operating a communication device. The method comprises: receiving from a network node device a dynamic scheduling DCI message for the normal dynamic uplink transmission at a same uplink sub-frame as uplink SPS transmission. In the dynamic scheduling DCI message, at least one field thereof is configured in a manner that the dynamic scheduling DCI implicitly indicates an uplink SPS release. As an alternative, the method comprises: receiving from the network node device an uplink SPS release DCI message to explicitly indicate the uplink SPS release.

According to one or more embodiments of the second aspect of the present disclosure, the method may further comprise: in response to receipt of the uplink SPS release DCI message, implicitly indicating to the network node device an uplink SPS release acknowledgement based on a PUCCH resource position carrying a HARQ feedback of the communication device.

According to the third aspect of the present disclosure, there is provided a network node device. The network node device comprises: a first determining unit configured to determine whether or not there is a dynamically scheduled uplink transmission for a communication device in an uplink sub-frame where the communication device needs to perform an uplink SPS release and a sending unit configured to notifying the communication device of an uplink SPS release. In response to determining that there is a dynamically scheduled uplink transmission for the communication device in the uplink sub-frame where the communication device needs to perform an uplink SPS release, the sending unit is configured to send to the communication device a dynamic scheduling DCI message for the normal dynamic uplink transmission. In the dynamic scheduling DCI message, the at least one field thereof is configured in a manner that the dynamic scheduling DCI implicitly indicates the uplink SPS release. In response to determining that there is no dynamically scheduled uplink transmission for the communication device in the uplink sub-frame where the communication device needs to perform an uplink SPS release, the sending unit is configured to send to the communication device an uplink SPS release DCI message to explicitly indicate the uplink SPS release.

According to one or more embodiments of the third aspect of the present disclosure, the network node device further comprises a second determining unit. In case that the uplink SPS release DCI message is sent to explicitly indicate the uplink SPS release, the second determining unit may be configured to determine the uplink SPS release state of the communication device based on whether a HARQ feedback from the communication device is carried on a PUCCH resource position, which is configured to implicitly indicate to the network node device a uplink SPS release acknowledgement.

According to the fourth aspect of the present disclosure, there is provided a communication device. The communication device comprises: a receiving unit configured to receive from a network node device a dynamic scheduling DCI message for the normal dynamic uplink transmission at a same uplink sub-frame as uplink SPS transmission, wherein at least one field of the dynamic scheduling DCI message is configured in a manner that the dynamic scheduling DCI implicitly indicates an uplink SPS release. Optionally, the receiving unit is configured to receive from the network node device an uplink SPS release DCI message to explicitly indicate the uplink SPS release.

According to one or more embodiments of the fourth aspect of the present disclosure, the communication device may further comprise: a sending unit configured to send a HARQ feedback of the communication device on a PUCCH resource position. In response to receipt of the uplink SPS release DCI message, the sending unit may be configured to implicitly indicate an uplink SPS release acknowledgement to the network node device based on the PUCCH resource position carrying the HARQ feedback of the communication device.

According to the fifth aspect of the present disclosure, there provides a network node device. According to an embodiment of the present disclosure, the network node device comprises a processing means adapted to determine whether or not there is a. dynamically scheduled uplink transmission for a communication device in an uplink sub-frame where the communication device needs to perform an uplink SPS, Semi-Persistent Scheduling, release; cause to send to the communication device, in response to determining that there is a dynamically scheduled uplink transmission for the communication device in the uplink sub-frame where the communication device needs to perform an uplink SPS release, a dynamic scheduling DCI message for the normal dynamic uplink transmission, wherein at least one field of the dynamic scheduling DCI message is configured in a manner that the dynamic scheduling DCI implicitly indicates the uplink SPS release; and cause to send to the communication device, in response to determining that there is no dynamically scheduled uplink transmission for the communication device in the uplink sub-frame where the communication device needs to perform an uplink SPS release, an uplink SPS release DCI message to explicitly indicate the uplink SPS release. According to an embodiment of the present disclosure, the processing means may comprise a processor and a memory and the memory may contain instructions executable by the processor.

According to the sixth aspect of the present disclosure, there provides a communication device. According to an embodiment of the present disclosure, the communication device comprises a processing means adapted to cause to receive from a network node device a dynamic scheduling DCI message for the normal dynamic uplink transmission at a same uplink sub-frame as uplink SPS transmission, wherein at least one field of the dynamic scheduling DCI message is configured in a manner that the dynamic scheduling DCI implicitly indicates an uplink SPS release; or cause to receive from the network node device an uplink SPS release DCI message to explicitly indicate the uplink SPS release. According to an embodiment of the present disclosure, the processing means may comprise a processor and a memory and the memory may contain instructions executable by the processor.

According to one or more embodiments of the present disclosure, the network node device is capable of informing the communication device of the uplink SPS release either implicitly through the normal dynamic scheduling DCI message or explicitly through the specific SPS release DCI message. As such, the embodiments of the present disclosure can support uplink SPS release and uplink dynamic scheduling simultaneously, which avoids potential service interruption. In one or more embodiments of the present disclosure, the communication device may implicitly acknowledge the uplink SPS release based on the PUCCH resource position of a HARQ feedback, which thereby implements more accurate and quicker acknowledgement of uplink SPS release.

BRIEF DESCRIPTION OF THE DRAWINGS

Inventive features regarded as the characteristics of the present invention are set forth in the appended claims. However, the present invention, its implementation mode, other objectives, features and advantages will be better understood through reading the following detailed description on the exemplary embodiments with reference to the accompanying drawings, where in the drawings:

DETAILED DESCRIPTION

Hereinafter, embodiments of the present disclosure will be described with reference to the accompanying drawings. In the following description, many specific details are illustrated so as to understand the present disclosure more comprehensively. However, it is apparent to the skilled in the art that implementation of the present invention may not have these details. Additionally, it should be understood that the present invention is not limited to the particular embodiments as introduced here. On the contrary, any combination of the following features and elements may be considered to implement and practice the present invention, regardless of whether they involve different embodiments. For example, while it is described below in the context of LTE or LTE-A type wireless communication system for illustrative purposes, those skilled in the art will recognize that one or more embodiments of the present disclosure can also be applied to various other types of wireless communication systems. Thus, the following aspects, features, embodiments and advantages are only for illustrative purposes, and should not be understood as elements or limitations of the appended claims, unless otherwise explicitly specified in the claims.

In the prior art, an uplink SPS release can be notified from a network node device, such as an eNB (evolved Node B), to a communication device, such as a UE (User Equipment), by using an uplink SPS release DCI (Downlink Control Indication) message, such as DCI format 0 indicating SPS-RNTI (SPS-Radio Network Temporary Identity) in a sub-frame in the SPS transmission window. However, according to 3GPP TS36.321, Version 12.2.1, section 5.4.1, UL grant reception section, only one DCI message can be granted to UE in a sub-frame to avoid too many blind detection of DCI0 on PDCCH (Physical Downlink Control Channel) at UE side. This means, when a normal uplink scheduling DCI0 (C-RNTI) message happens to meet an uplink SPS release DCI0 (SPS-RNTI) message at the same uplink sub-frame, the normal DCI0 (C-RNTI) message will override the uplink SPS release DCI0 (SPS-RNTI) message. The network node device has to postpone the notification of the uplink SPS release for the communication device to the next SPS period transmission window. Due to existing constraint of only one DCI0 message allowed in PDCCH per TTI (Transmission Time Interval)/sub-frame, the existing solution can NOT implement dynamic scheduling at the same time as uplink SPS release at the same sub-frame, which adds the possibility of uplink transmission interruption.

Figure 1:
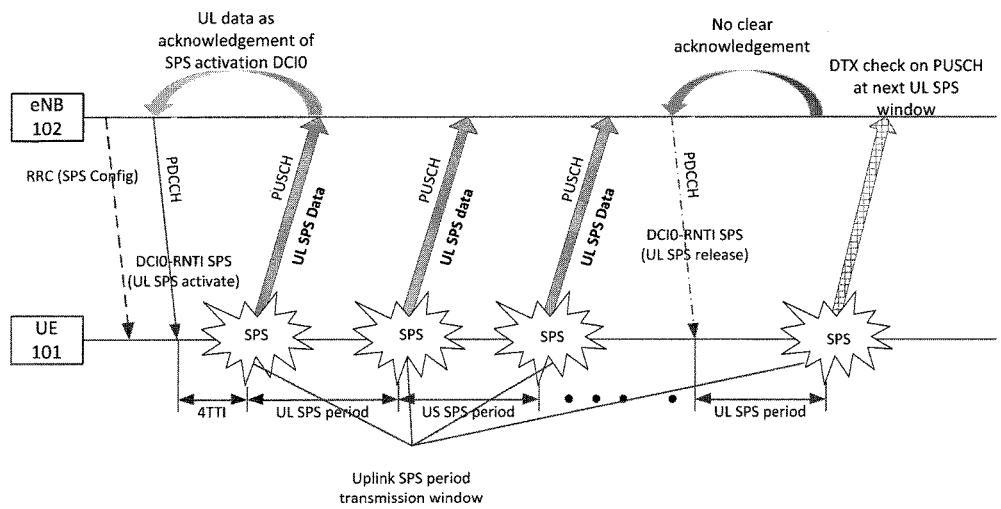
FIG. 1 is a diagram schematically illustrating uplink SPS release acknowledgement using DTX (Discontinuous Transmission) checking according to prior art.

The existing acknowledgement of the uplink SPS release also has some technical problems. FIG. 1 is a diagram schematically illustrating uplink SPS release acknowledgement using DTX (Discontinuous Transmission) checking according to prior art. As shown in FIG. 1, after sending an uplink SPS release to a communication device, such as UE 101, the network node device, such as eNB 102 doesn't release the corresponding PRB (Physical Radio Block) resources immediately. Instead eNB 102 proceeds to monitor the PRB resources at next uplink SPS transmission time. The eNB 102 determines the uplink SPS release status of UE 101 only based on whether there is DTX (Discontinuous Transmission) on those PRBs on PUSCH (Physical Uplink Shared Channel), regardless of successful decoding or not. As long as eNB 102 fails to detect DTX on those PRBs, it recognizes the uplink SPS release failure and restarts SPS release procedure again. However such existing SPS release acknowledgement method has following defects:

Inaccurate Acknowledgement

The existing uplink SPS release acknowledgement method fully relies on the DTX detection on PUSCH. However, it is inaccurate compared with normal ACK/NACK acknowledgment method, since even if UE 101 indeed sends nothing on the PRBs of PUSCH, eNB 102 may still check the power caused by noise and interference. Due to only power instead of the content of the acknowledgement message being checked, it is almost impossible for eNB 102 to distinguish the real SPS transmission from the noise or interference in the communication channel. As a result, the existing acknowledgement method based on DTX detection may cause eNB 102 to repeat the SPS release procedure unnecessarily many times, even if UE 101 has accepted the uplink SPS release DCI0 message.

Long Waiting Time

Even if UE has successfully received the SPS release DCI0, eNB still needs to wait until next UL SPS transmission sub-frame to do the DTX check, then at most one SPS period interval (e.g. at least 20 ms) has elapsed already. To be worse, if the SPS release procedure is repeated several times due to above inaccurate DTX check, the total waiting time will has to be prolonged, during which the corresponding PUSCH resources cannot be allocated to other UEs to avoid the potential interference between UEs.

Once the uplink SPS release cannot be issued from the network node device in a proper and effective way or is missed by the communication device, the uplink SPS release would be failed. As a consequence, the network node device would not release PRB resources for other communication devices, and the SPS communication device also has no idea of uplink SPS release and will proceed to send uplink data on the reserved PRB resources, thereby causing confliction with other communication devices. To be worse, without a successful SPS release procedure, the uplink SPS data will be transmitted periodically; such confliction will last endlessly until the SPS communication device has no uplink SPS data to send.

In order to solve at least one of the existing problems as described above, one or more embodiments of the present disclosure intents to provide one or more novel and inventive solutions of uplink SPS release procedure.

In the present disclosure, communication devices also known as mobile terminals, wireless terminals and/or User Equipment (UE) are enabled to communicate wirelessly with a network node in a wireless communication system, sometimes also referred to as a cellular radio system. For instance, a communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The communication device may be a portable, pocket-storable, handheld, computer-comprised, or vehicle-mounted mobile device, enabled to communicate voice and/or data, via a wireless or wireline connection.

Typically, a network node device may serve or cover one or several cells of the wireless communication system. That is, the network node device provides radio coverage in the cell(s) and communicates over an air interface with communication devices operating on radio frequencies within its range. The network node device in some wireless communication systems may be also referred to as "eNB", "eNodeB", "NodeB" or "B node", depending on the technology and terminology used. In the present disclosure, the network node device may also be referred to as a Base Station (BS). The network node devices may be of different classes such as e.g. macro eNodeB, home eNodeB or pico base station, or relay node, based on transmission power and thereby also cell size.

With reference to FIGS. 2-7, various embodiments of the present disclosure are described in detail.

Figure 2:
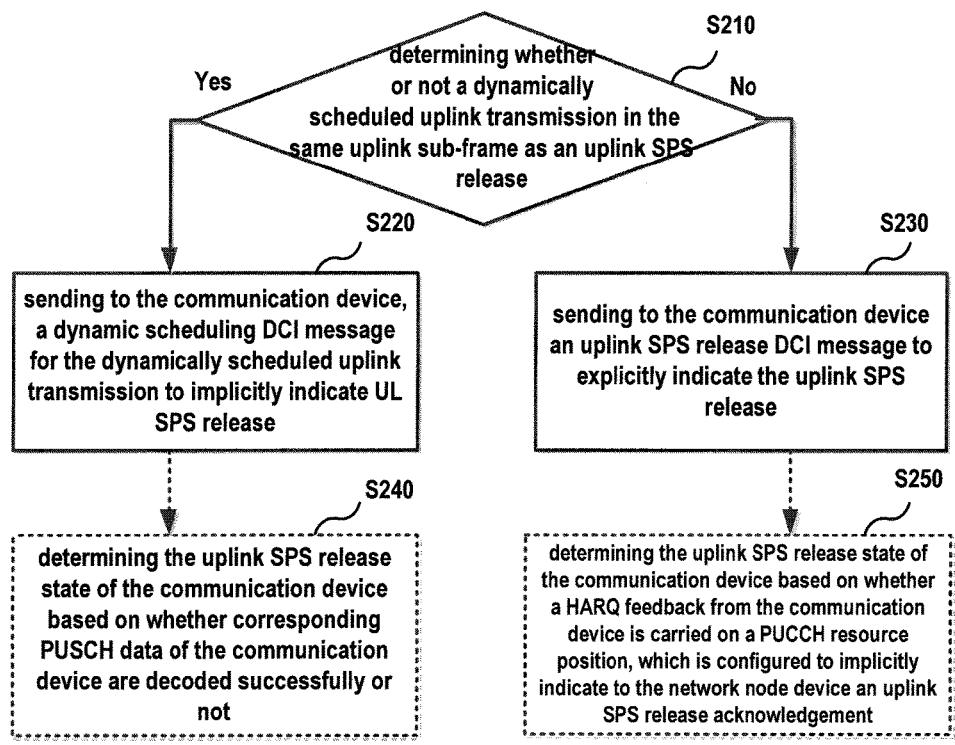
FIG. 2 is a diagram schematically illustrating an exemplary flow chart of a method for operating a network node device according to one or more embodiments of the present disclosure.

FIG. 2 is a diagram schematically illustrating an exemplary flow chart of a method 200 for operating a network node device according to one or more embodiments of the present disclosure.

As shown in FIG. 2, in step S210, the network node device determines whether or not there is a dynamically scheduled uplink transmission for a communication device in an uplink sub-frame where the communication device needs to perform an uplink SPS release. In this way, the network node device can decide whether an implicit uplink SPS release or an explicit uplink SPS release can be applied for the communication device.

In an exemplary implementation, the network node device may expect to release uplink SPS for the communication device at the deadline, for example, the $(n-4)^{th}$ sub-frame prior to the next uplink SPS transmission window, for example, the $n^{th}$ uplink sub-frame, and meanwhile also schedules a dynamic uplink transmission just at the next uplink SPS transmission window. In that situation, the dynamic uplink transmission happens to meet the uplink SPS release at the same uplink sub-frame, i.e., the $n^{th}$ uplink sub-frame. According to the embodiments of the present disclosure, the network node device has to adopt implicit SPS release mechanism, since only dynamic uplink scheduling DCI0 message is allowed in PDCCH per TTI/sub-frame.

If the determination result of step S210 is "Yes", i.e., the dynamic uplink scheduling DCI0 (C-RNTI) message coexists with the uplink SPS release DCI0 (SPS-RNTI) message in the same sub-frame, the process proceeds with step S220 to adopt the implicit SPS release mechanism.

In step S220, the network node device sends to the communication device a dynamic scheduling DCI message, for example DCI0 (C-RNTI), for the dynamically scheduled uplink transmission. At least one field of the dynamic scheduling DCI message is configured in a manner that the dynamic scheduling DCI implicitly indicates the uplink SPS release.

According to one or more embodiments of the present disclosure, the at least one field of the dynamic scheduling DCI message includes a field of the dynamic scheduling DCI message specifying a cycle shift for DMRS (Demodulation Reference Signal). Once deciding to adopt the implicit uplink SPS release, the network node device may need to set a cyclic Shift for PUSCH DMRS in the normal dynamic scheduling DCI message DCI0 (C-RNTI) to the same value as that used for uplink SPS. Otherwise, the cycle shift for DMRS field of the normal dynamic uplink scheduling DCI message DCI0 (C-RNTI) is set to another different value from that used for uplink SPS.

Specifically, if the normal dynamic scheduling DCI message DCI0 (C-RNTI) has same cyclic shift for DMRS as that used for uplink SPS, it implies the uplink SPS release. Otherwise, the dynamic scheduling DCI message DCI0 (C-RNTI) just indicates a normal uplink scheduling, has nothing to do with the uplink SPS release. If the dynamic scheduling DCI message DCI0 (C-RNTI) is lost, the existing loss detection mechanism for the dynamic scheduling DCI message, such as content check of PUSCH data at the relevant sub-frame, can work and the network node device need to retransmit another dynamic scheduling DCI message DCI0 (C-RNTI) to implicitly indicate UL SPS release.

In these embodiments, the method 200 may further comprise step S240, in which the uplink SPS release state of the communication device can be determined based on whether corresponding PUSCH data of the communication device are decoded successfully or not by using the cycle shift for demodulation reference signal specified by the field of the dynamic scheduling DCI message. Considering PRB resources in PUSCH is mostly exclusive among different UEs (except of MU-MIMO), it may be easy for the network node device to select a needed DMRS for any specific communication device from 8 available ones.

It would be appreciated that if the dynamic uplink scheduling DCI0 (C-RNTI) message coexists with the uplink SPS release DCI0 (SPS-RNTI) message at a much earlier sub-frame than the SPS release deadline, e.g. the $(n-6)^{th}$ sub-frame, the network node device may not necessarily perform step S220 at all to use the dynamic uplink scheduling DCI0 (C-RNTI) message to implicitly indicate UL SPS release. As an additional or alternative implementation, the network node device may simply postpone (not shown in FIG. 2) the uplink SPS release to the subsequent sub-frame, i.e., the $(n-5)^{th}$ sub-frame, which is still prior to the final deadline for the uplink SPS release, so as to avoid the confliction with the dynamic uplink scheduling DCI message.

If the determination result of step S210 is "No", i.e., the dynamic uplink scheduling DCI0 (C-RNTI) message does not coexist with the uplink SPS release DCI0 (SPS-RNTI) message in the same sub-frame, the process proceeds with step S230 to adopt the explicit SPS release mechanism.

In step S230, the network node device sends to the communication device an uplink SPS release DCI message, for example DCI0 (SPS-RNTI) to explicitly indicate the uplink SPS release.

According to one or more embodiments of the present disclosure, in case that uplink SPS release DCI message is sent to explicitly indicate the uplink SPS release, the method 200 may further comprise step S250, in which the uplink SPS release state of the communication device is determined based on whether a HARQ (Hybrid Automatic Repeat Request) feedback from the communication device is carried on a PUCCH (Physical Uplink Control Channel) resource position. The PUCCH resource position may be configured to implicitly indicate to the network node device an uplink SPS release acknowledgement. It should be note that the concept of PUCCH resource position complies with the 3GPP standard specification, for example, in, 3GPP TS 36.211 "Evolved Universal Terrestrial Radio Access (E-UTRA); Physical Channels and Modulation", Version 12.2.0, Section 5.4.1: "Resources used for transmission of PUCCH format 1, 1a and 1b are identified by a resource index $n_{PUCCH}^{(1,\tilde{p})}$ from which the orthogonal sequence index $n_{oc}^{(\tilde{p})}(n_s)$ and the cyclic shift $a_{\tilde{p}}(n_s,l)$ are determined according to . . . ", which is entirely incorporated here by reference.

Figure 3:
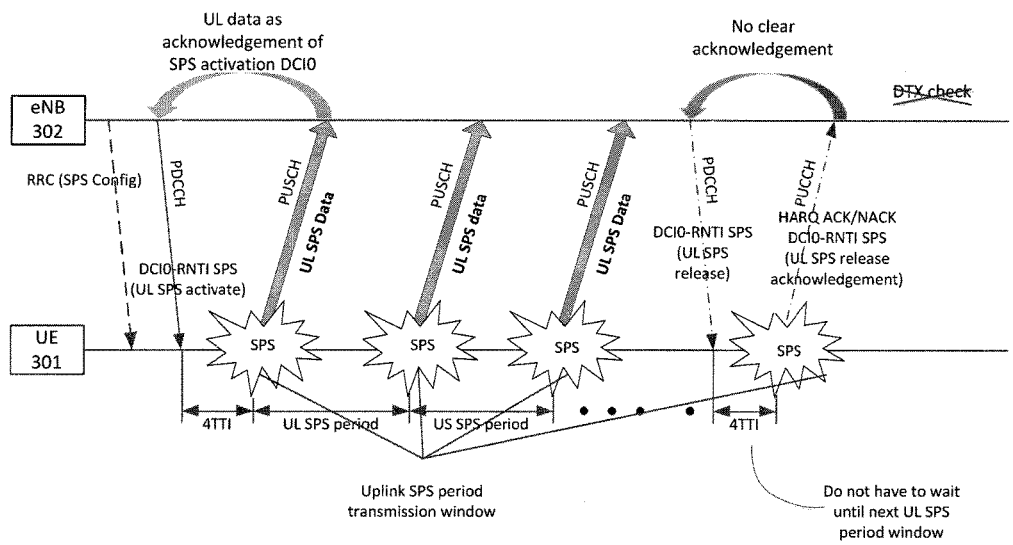
FIG. 3 is a diagram schematically illustrating uplink SPS release acknowledgement using downlink HARQ feedback according to one or more embodiments of the present disclosure.

FIG. 3 is a diagram schematically illustrating uplink SPS release acknowledgement using downlink HARQ feedback according to one or more embodiments of the present disclosure.

As shown in FIG. 3, the explicit HARQ feedback acknowledgement mechanism based on corresponding PUCCH resource position may be adopted between eNB 302 and UE 301, so as to provide the network node device a more accurate and real-time uplink SPS release acknowledgement approach than the existing PUSCH DTX checking workaround in the prior art. Since the HARQ feedback on PUCCH is carried on the orthogonal ZC sequence and spread using Walsh code, its robustness resistant to noise and interference is much better than PUSCH DTX checking.

The HARQ feedback (ACK/NACK) content sent back from UE 301 is up to actual reception status of the downlink transmissions (such as downlink dynamic scheduling or downlink SPS reactivation/release) at the communication device, but the PUCCH resource position is no longer derived from starting CCE index of those downlink DCIs.

According to one or more embodiments of the present disclosure, the PUCCH resource position carrying the HARQ feedback of UE 301 may be calculated based on a lowest index of CCEs (Control Channel Elements) carrying the uplink SPS release DCI message on PDCCH. For example, the PUCCH resource position may be decided according to the existing 3GPP TS 36.213 standard PUCCH-HARQ calculation formula taking the corresponding CCE index $n_{CCE}$ as input, just same as that done in downlink SPS release acknowledgement, where is the first CCE (i.e. lowest CCE index) in PDCCH that is used to carry the uplink SPS release DCI message DCI0 (SPS-RNTI). 3GPP TS 36.213, V12.2.0, "Evolved Universal Terrestrial Radio Access (E-UTRA); Physical layer procedures" Version are entirely incorporated herein by reference.

In some situations, a SR (Scheduling Request) of the communication device, such as UE 301, may happen to occur at the same uplink sub-frame as the HARQ feedback. Since there is single-carrier constraint at uplink, it prevents the communication device to send two independent signals HARQ and SR at two different PUCCH resource positions. The existing standard specifies that the HARQ feedback should be moved from its original position to the SR PUCCH resource position to handle SR/HARQ multiplexing. If the HARQ feedback is relocated to the SR's PUCCH resource position, it may result in that the information of the SR's PUCCH resource position carrying the HARQ feedback cannot indicate the uplink SPS release acknowledgement any more, which is however key point to determine the SPS release reception status of the communication device, such as UE 301.

To resolve the above issue for the uplink SPS release procedure, the present disclosure provides two solutions A and B, which may work either alone or in combination together to solve the SR and HARQ multiplexing.

Solution A: besides of the existing PUCCH resource position implicitly indicating the uplink SPS release acknowledgement used for the case without SR multiplexing with HARQ feedback, the network node device may allocate other idle PUCCH resource position for the HARQ feedback for the case with SR multiplexing with HARQ feedback.

According to one or more embodiments of the present disclosure, in case that the network node device receives the HARQ feedback in the same uplink sub-frame as SR from the communication device, the PUCCH resource position carrying the HARQ feedback of the communication device may be allocated on an idle PUCCH resource position instead of that configured for the SR, so as to indicate the uplink SPS release acknowledgement together with the SR. In case that the network node device only receives the HARQ feedback in an uplink sub-frame without multiplexing with a SR of the communication device, the PUCCH resource position carrying the HARQ feedback of the communication device may be still the PUCCH resource position, for example, derived from the 1$^{st}$ CCE (with the lowest CCE index) carrying the uplink SPS release DCI message DCI0.

In PDCCH, there are a number of CCEs (at most 88 CCEs in 20 M spectrum and CFI=3), each of which has one-to-one relationship with a PUCCH resource position at next n+4 TTI. A uplink SPS release DCI message DCI0 (SPS-RNTI) may occupy 1, 2, 4 and 8 consecutive CCEs according to air interface quality, but only PUCCH position corresponding to starting CCE index is used for HARQ feedback, in other word, other PUCCH positions are left unused. For example of aggregation level 2, PUCCH position Pn and Pn+1 correspond to CCEn and CCEn+1 respectively. Accordingly to 3GPP standard, HARQ feedback is carried on Pn, then Pn+1 is blank. For level 4 and 8, there are 3 and 7 PUCCH positions left unused respectively.

Besides of such idle PUCCH positions, there is still another unseen position hidden in PUCCH. Since there are 4 (Walsh codes 00-03) orthogonal Walsh codes for each ZC sequence cycle shift, but only 3 Walsh codes (Walsh codes 00-02) maybe defined to identify PUCCH positions, at least the last one Walsh codes 03 is NOT actually used at all. According to one or more embodiments of the present disclosure, the idle PUCCH resource position is generally defined by an unused Walsh code for any ZC sequence cycle shift to indicate uplink SPS release acknowledgement together with a SR.

Figure 4A:
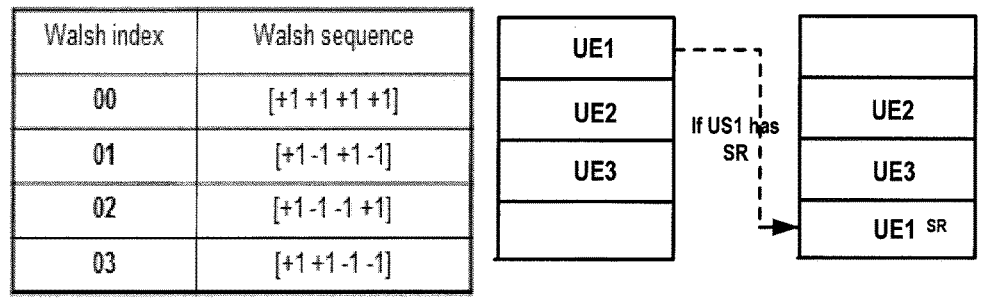
FIG. 4A is a diagram schematically illustrating an example of use of an idle PUCCH position.

FIG. 4A is a diagram schematically illustrating an example of use of an idle PUCCH position. As shown in FIG. 4A, Walsh codes 00, 01, 02 are assigned to UE1, UE2, UE3 respectively to specify the PUCCH resource positions, while Walsh code 03 is unused. So for CCE aggregation level 1 case, although no other PUCCH position is available according to existing CCE mapping formula, the Walsh code 03 can provide one more position as long as the communication device modulates HARQ feedback using the Walsh code 03 and the network node device demodulates it also using Walsh code 03.

Figure 4B:
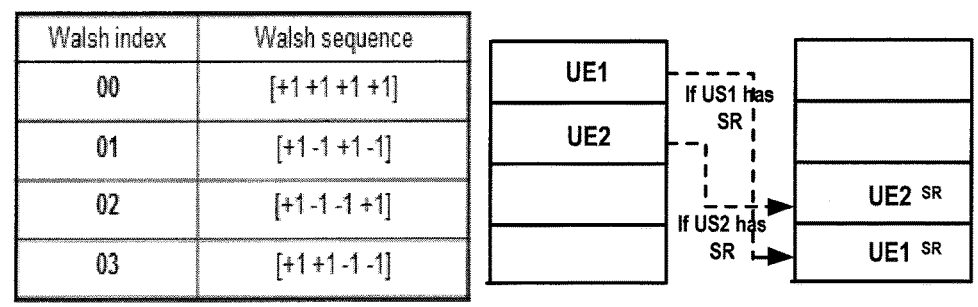
FIG. 4B is a diagram schematically illustrating another example of use of an idle PUCCH position.

FIG. 4B is a diagram schematically illustrating another example of use of an idle PUCCH position. As shown in FIG. 4B, UE1, UE2 are assigned with Walsh codes 00, 01 respectively to specify the PUCCH resource positions, while Walsh code 02 as well as Walsh code 03 are unused in this example. Idle PUCCH resource positions can be defined by unused both Walsh codes 02 and 03 for any ZC sequence cycle shift, so that UE1 and UE2 may use the idle PUCCH resource positions to indicate their uplink SPS release acknowledgement multiplexing with their respective SRs.

Since such PUCCH positions are identified through different ZC sequence cycle shifts and Walsh codes, independent from uplink modulation method. From uplink modulation perspective, those positions are actually completely same, so UE uses different positions to transmit HARQ feedback not only can indicate the SR along with the uplink SPS release acknowledgement, but also will not cause reception performance downgrade at the network node side.

The network node could have overview of all available PUCCH positions, while the communication device is only aware of its own position calculated according to existing mapping formula based on a lowest index of CCEs carrying the uplink SPS release DCI message on PDCCH. So the network node device needs to notify the communication device of the use of the other idle PUCCH resource position to carry HARQ feedback when it multiplexes with the SR of the communication device.

According to one or more embodiments of the present disclosure, the uplink SPS release DCI message DCI0 (SPS-RNTI), which is notified from the network node device to the communication device, may include information associated with the idle PUCCH resource position which is used to implicitly indicate the uplink SPS release acknowledgement together with the SR. In an exemplary implementation, the 2 bits TPC (Transmission Power Control) field of the uplink SPS release DCI message may be used to indicate the information of allocated PUCCH resource position, since the TPC field no longer needs to be used as the power control command in the uplink SPS release procedure.

Solution B: the SR of the communication device may be modulated onto a demodulation reference signal symbol at a predetermined slot of the PUCCH resource position that is used to implicitly indicate the uplink SPS release acknowledgement.

Considering the interval between DMRS symbols within two slots is 0.5 ms under normal CP (Cyclic Prefix) environment, it means the air interface channel coherence time can be recognized >=0.5 ms under most cases, i.e., air interface channel condition for the communication device almost remains similarity within 0.5 ms, which makes it possible for the network node device to do channel estimation even if DMRS signals within one slot are modulated by a SR.

According to 3GPP TS36.211, V12.2.0, Section 5.5.2.2.1, the PUCCH demodulation reference signal sequence $r_{PUCCH}^{(\tilde{p})}(.)$ defined by $$r_{PUCCH}^{(\tilde{p})}(m'N_{RS}^{PUCCH}M_{sc}^{RS} + mM_{sc}^{RS} + n) = \frac{1}{\sqrt{P}}\bar{w}^{(\tilde{p})}(m)z(m)r_{u,v}^{(\alpha_{\tilde{p}})}(n).$$

The reference signal sequence $r_{u,v}^{(\alpha_{\tilde{p}})}(n)$ is defined by a cyclic shift $\alpha$ of a base sequence $\bar{r}_{u,v}(n)$ according to $r_{u,v}^{(\alpha)}(n) = e^{j\alpha n}\bar{r}_{u,v}(n)$, $0 \leq n < M_{sc}^{RS}$, with $M_{sc}^{RS} = 12$ where the expression for the cyclic shift $\alpha_{\tilde{p}}$, is determined by the PUCCH format. The parameters and technical meanings of the above cited equations have been clearly specified in 3GPP TS36.211, V12.2.0, Section 5.5.2.2.1, the entire contents of which is incorporated herein by reference. Detailed descriptions of well-known equations incorporated herein may be omitted for the sake of clarity and conciseness.

In order to indicate a SR along with in HARQ feedback on the same PUCCH resource position, the communication device may introduce a phase offset $\pi$ onto antenna-port specific cyclic shift $\alpha_{\tilde{p}}$ for the DMRS in $2^{nd}$ slot PUCCH format 1a/1b like following:

$$\alpha_{\tilde{p}}(n_s,l) = 2\pi \cdot \bar{n}_{cs}^{(\tilde{p})}(n_s,l)/N_{sc}^{RB} \quad n_s \bmod 2 = 0 \qquad \text{slot 0}$$

$$\alpha_{\tilde{p}}(n_s,l) = 2\pi \cdot \bar{n}_{cs}^{(\tilde{p})}(n_s,l)/N_{sc}^{RB} + \pi \quad n_s \bmod 2 = 1 \qquad \text{slot 1}$$

wherein $n_s$ is the slot number, l is symbol number, $n_{cs}^{(\tilde{p})}(n_s,l)$ is a function of $n_s$ and l used to calculate the cycle shift (refer to 3GPP TS36.211, V12.2.0, section 5.4.1), $N_{sc}^{RB}$ is number of subcarriers within one RB.

When the air channel coherent time >0.5 ms, e.g. cell is deployed in suburban and the communication device does not move with high speed, the DMRS in $2^{nd}$ slot can be recognized by the network node device as similar (phase difference<$\pi$) with that in $1^{st}$ slot. Through checking the phase difference of DMRS between 2 slots, the network node device may determine if the communication device has the SR to send.

Considering above precondition (the air channel coherent time >0.5 ms) is NOT always TRUE, the solution B may controlled by an enabler flag in RRC message. Through manual configuration or measurement of UE moving speed, the network node device can decide if above precondition for the specific communication device is met or NOT.

The embodiments according to Solution B may achieve higher reception performance due to:
- HARQ is a QPSK symbol in some cases, but the SR is always a BPSK symbol. After modulated on DMRS, BPSK can introduce maximum 180 degree phase shift, much larger than 90 degree phase shift introduced by QPSK. Accordingly its impact on channel estimation is also decreased.
- PUCCH format 2a/2b has only two DMRS symbols in each slot for normal CP, but PUCCH format 1a/1b has three DMRS symbols in each slot for normal CP. So it has higher successful rate and robustness for SR blind detection.

In some embodiments, Solution B may act as an alternative solution of Solution A to handle the case of the SR multiplexing with the HARQ feedback. However, in other embodiments, Solution B may also act as an additional solution of Solution A, for example, in case that there is no idle PUCCH position available. Therefore, the above two Solutions A and B are NOT exclusive. Instead they are compatible and can coexist with each other.

Figure 5:
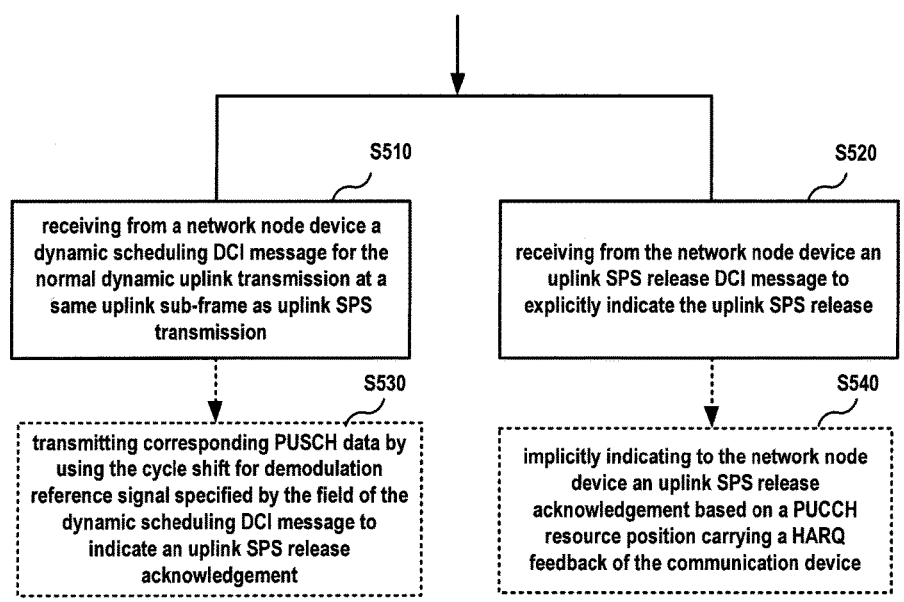
FIG. 5 schematically illustrates an exemplary flow chart of a method for operating a communication device according to one or more embodiments of the present disclosure.

FIG. 5 schematically illustrates an exemplary flow chart of a method (500) for operating a communication device according to one or more embodiments of the present disclosure.

As shown in FIG. 5, in step S510, the communication device receives from a network node device a dynamic scheduling DCI message for the normal dynamic uplink transmission at a same uplink sub-frame as uplink SPS transmission. At least one field of the dynamic scheduling DCI message is configured in a manner that the dynamic scheduling DCI implicitly indicates an uplink SPS release.

According to one or more embodiments of the present disclosure, the at least one field of the dynamic scheduling DCI message may include a field of the dynamic scheduling DCI message specifying a cycle shift for demodulation reference signal, which is used to implicitly indicate the uplink SPS release.

According to one or more embodiments of the present disclosure, in case that the dynamic scheduling DCI message is received to implicitly indicate the uplink SPS release, the communication device may further transmit, in step S530, corresponding PUSCH data to the network node device by using the cycle shift for demodulation reference signal specified by the field of the dynamic scheduling DCI message, so as to indicate an uplink SPS release acknowledgement.

As another branch of step S510, depending upon the scheduling of the network node device, in step S520, the communication device receives from the network node device an uplink SPS release DCI message, which explicitly indicates the uplink SPS release.

According to one or more embodiments of the present disclosure, in step S540, in response to receipt of the uplink SPS release DCI message, the communication device may implicitly indicate to the network node device an uplink SPS release acknowledgement based on a PUCCH resource position carrying a HARQ feedback of the communication device. In one or more embodiments, the PUCCH resource position carrying the HARQ feedback of the communication device is calculated based on based on a lowest index of CCEs carrying the uplink SPS release DCI message.

According to one or more embodiments of the present disclosure, in case that the HARQ feedback is transmitted in an uplink sub-frame together with a SR of the communication device, according to Solution A, the PUCCH resource position carrying the HARQ feedback of the communication device may be allocated on an idle PUCCH resource position. In one or more embodiments, the idle PUCCH resource position may be defined by an unused Walsh code for any ZC sequence cycle shift, so as to be used to indicate uplink SPS release acknowledgement together with the SR. The communication device may be obtain information associated with the idle PUCCH resource position from the uplink SPS release DCI message sent by the network node device.

Alternatively or additionally, in case that the HARQ feedback is transmitted in an uplink sub-frame together with a SR of the communication device, according to Solution B, the HARQ feedback may be transmitted on the PUCCH resource position related with the uplink SPS release and the SR of the communication device may be modulated onto a demodulation reference signal symbol at a predetermined slot of the same PUCCH resource position.

In order to indicate a SR along with in HARQ feedback on the same PUCCH resource position, the communication device may introduce a phase offset $\pi$ onto antenna-port specific cyclic shift for the DMRS in $2^{nd}$ slot PUCCH format 1a/1b. The communication device may receive an enabler flag in an RRC message from the network node device, so as to enable Solution B.

Figure 6:
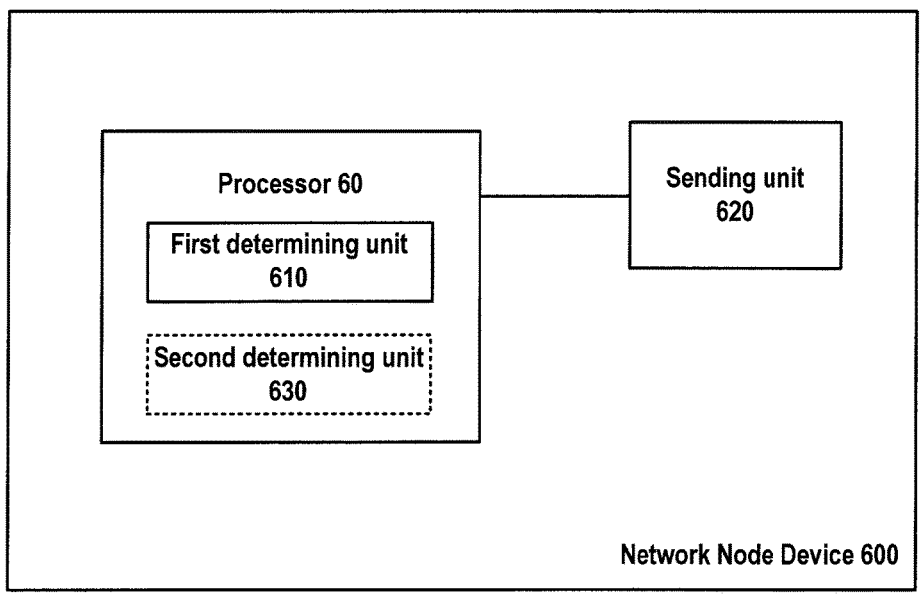
FIG. 6 is a block diagram schematically illustrating a network node device according to one or more embodiments of the present disclosure.

FIG. 6 is a block diagram schematically illustrating a network node device 600 according to one or more embodiments of the present disclosure.

As shown in FIG. 6, the network node device 600 such as the eNB 301 as shown in FIG. 3 comprises a first determining unit 610 and a sending unit 620 for communicating with a communication device such as the UE 302 as shown in FIG. 3. The network node device 600 and the communication device operate in uplink SPS communication mode and uplink SPS data are transmitted in every uplink SPS transmission window. The network node device 600 already decides to terminate the uplink SPS transmission mode with the communication, thereby notifies the communication device to release the uplink SPS transmission resources. The sending unit 620 may comprise any suitable hardware components for bidirectional wireless communications with one or more communication devices. For example, the sending unit 620 maybe implemented as a suitable radio frequency transceiver for wireless communications with one or more communication devices via one or more antennas (not shown in FIG. 6).

The network node device 600 comprises a processor 60, which includes one or more microprocessor or microcontrollers, as well as other digital hardware, which may include digital signal processors (DSPs), special-purpose digital logic, and the like. The processor 60 may be configured to execute program code stored in memory (not shown in FIG. 6), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The first determining unit 610 is configured to determine whether or not there is a dynamically scheduled uplink transmission for a communication device in an uplink sub-frame where the communication device needs to perform an uplink SPS release. In an exemplary implementation, as shown in FIG. 6 for example, the first determining unit 610 may be implemented based on a part of the functionality of the processor 60, while in another implementations, the first determining unit 610 may also implemented by a separate and specific processing means (not shown in FIG. 6).

The sending unit 620 is configured to send to the communication device, in response to determining by the first determining unit 610 that there is a dynamically scheduled uplink transmission for the communication device in the uplink sub-frame where the communication device needs to perform an uplink SPS release, a dynamic scheduling DCI message for the dynamically scheduled uplink transmission. At least one field of the dynamic scheduling DCI message is configured in a manner that the dynamic scheduling DCI implicitly indicates the uplink SPS release. According to one or more embodiments of the present disclosure, the at least one field of the dynamic scheduling DCI message may include a field of the dynamic scheduling DCI message specifying a cycle shift for demodulation reference signal.

The sending unit 620 is configured to send to the communication device, in response to determining by the first determining unit 610 that in response to determining that there is no dynamically scheduled uplink transmission for the communication device in the uplink sub-frame where the communication device needs to perform an uplink SPS release, an uplink SPS release DCI message to explicitly indicate the uplink SPS release.

According to one or more embodiments of the present disclosure, the network node device 600 may further comprise a second determining unit 630 for determining the uplink SPS release status of the communication device. In an exemplary implementation, as shown in FIG. 6 for example, the second determining unit 630 may be implemented based on a part of the functionality of the processor 60, while in another implementations, the second determining unit 630 may also implemented by a separate and specific processing means (not shown in FIG. 6).

In case that the dynamic scheduling DCI message is sent to implicitly indicate the uplink SPS release, the second determining unit 630 may be configured to determine the uplink SPS release state of the communication device based on whether corresponding PUSCH data of the communication device are decoded successfully or not by using the cycle shift for demodulation reference signal specified by the field of the dynamic scheduling DCI message.

In case that the uplink SPS release DCI message is sent to explicitly indicate the uplink SPS release, the second determining unit 630 maybe configured to determine the uplink SPS release state of the communication device based on whether a HARQ feedback from the communication device is carried on a PUCCH resource position, which is configured to implicitly indicate to the network node device an uplink SPS release acknowledgement. In one or more embodiments of the present disclosure, the PUCCH resource position carrying the HARQ feedback of the communication device may be calculated based on based on a lowest index of CCEs carrying the uplink SPS release DCI message.

According to one or more embodiments of the present disclosure, in case that the HARQ feedback is received in an uplink sub-frame together with a SR of the communication device, according to Solution A, the PUCCH resource position carrying the HARQ feedback of the communication device may be allocated on an idle PUCCH resource position. For example, the idle PUCCH resource position may be defined by an unused Walsh code for any ZC sequence cycle shift to indicate uplink SPS release acknowledgement with the SR. In these embodiments, the network node device 600 may need to notify to the communication device of the defined idle PUCCH resource position. According to an embodiment of the present disclosure, the uplink SPS release DCI message sent by the sending unit 620 may include information associated with the idle PUCCH resource position which is used to implicitly indicate the uplink SPS release acknowledgement together with the SR.

Additionally or alternatively, in case that the HARQ feedback is received in an uplink sub-frame together with a SR of the communication device, according to Solution B, the SR of the communication device may be modulated onto a demodulation reference signal symbol at a predetermined slot of the PUCCH that is used to implicitly indicate the uplink SPS release acknowledgement. The network node device 600 may notify the communication device by an RRC message of whether to enable Solution B.

Figure 7:
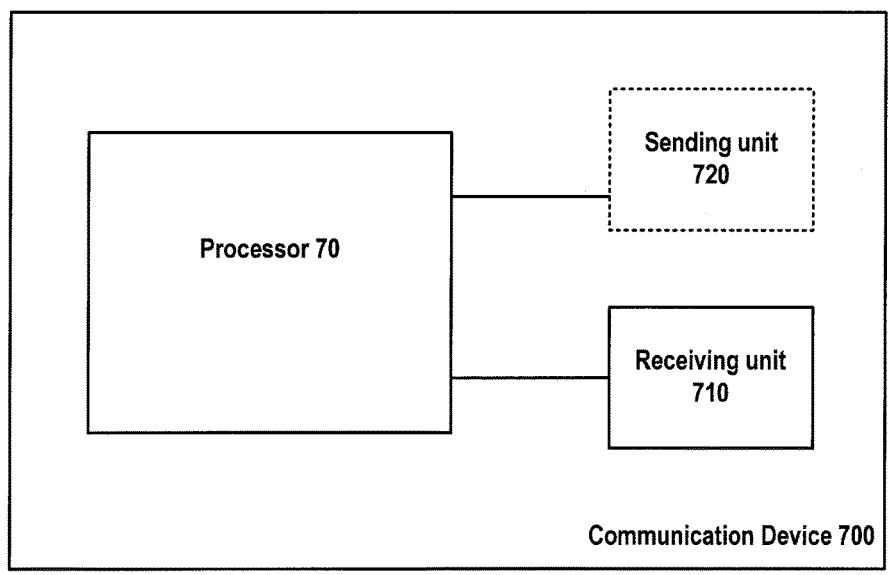
FIG. 7 is a block diagram schematically illustrating a communication device according to one or more embodiments of the present disclosure.

FIG. 7 is a block diagram schematically illustrating a communication device 700 according to one or more embodiments of the present disclosure.

As shown in FIG. 7, the communication device 700, such as the UE 302 as shown in FIG. 3, comprises a receiving unit 710. The receiving unit 710 may comprise any suitable hardware components for wireless communications with the network node device. For example, the first receiving unit 710 may be implemented as a suitable radio frequency transceiver for wireless communications with a network node device via one or more antennas (not shown in FIG. 7).

The communication device 700 comprises a processor 70, which includes one or more microprocessor or microcontrollers, as well as other digital hardware, which may include digital signal processors (DSPs), special-purpose digital logic, and the like. The processor 70 may be configured to execute program code stored in memory (not shown in FIG. 7), which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The first receiving unit 710 is configured to receive from a network node device a dynamic scheduling DCI message for the dynamically scheduled uplink transmission at a same uplink sub-frame as uplink SPS transmission. At least one field of the dynamic scheduling DCI message is configured in a manner that the dynamic scheduling DCI implicitly indicates an uplink SPS release.

According to one or more embodiments of the present disclosure, the at least one field of the dynamic scheduling DCI message may include a field of the dynamic scheduling DCI message specifying a cycle shift for demodulation reference signal.

According to one or more embodiments of the present disclosure, the communication device 700 may further comprise a sending unit 720 configured to indicate to the network node device an uplink SPS release acknowledgement upon receipt of the uplink SPS release.

According to one or more embodiments of the present disclosure, in case that the dynamic scheduling DCI message is received to implicitly indicate the uplink SPS release, the sending unit 720 may be configured to transmit corresponding PUSCH data to the network node device by using the cycle shift for demodulation reference signal specified by the field of the dynamic scheduling DCI message to indicate an uplink SPS release acknowledgement.

As another parallel functionality, depending upon the scheduling of the network node device, the receiving unit 710 is configured to receive from the network node device an uplink SPS release DCI message to explicitly indicate the uplink SPS release.

According to one or more embodiments of the present disclosure, the sending unit 720 may be configured to send a HARQ feedback of the communication device on a PUCCH resource position. In response to receipt of the uplink SPS release DCI message, the sending unit 720 may be configured to implicitly indicate an uplink SPS release acknowledgement to the network node device based on the PUCCH resource position carrying the HARQ feedback of the communication device. In one or more embodiments, the PUCCH resource position carrying the HARQ feedback of the communication device may be calculated based on based on a lowest index of CCEs carrying the uplink SPS release DCI message.

According to one or more embodiments of the present disclosure, in case that the HARQ feedback is transmitted in an uplink sub-frame together with a SR of the communication device, according to Solution A, the PUCCH resource position carrying the HARQ feedback of the communication device may be allocated on an idle PUCCH resource position. In one or more embodiments, the idle PUCCH resource position may be defined by an unused Walsh code for any ZC sequence cycle shift to indicate uplink SPS release acknowledgement together with the SR. The communication device 700 may be obtain information associated with the idle PUCCH resource position from the uplink SPS release DCI message received from the network node device.

Alternatively or additionally, in case that the HARQ feedback is transmitted in an uplink sub-frame together with a SR of the communication device, according to Solution B, the HARQ feedback may be transmitted on the PUCCH resource position related with the uplink SPS release and the SR of the communication device may be modulated onto a demodulation reference signal symbol at a predetermined slot of the same PUCCH resource position. The communication device 700 may be informed to enable Solution B by a RRC message sent by the network node device.

Embodiments according to the present disclosure provide one or more solutions for uplink SPS release procedure. According to one or more embodiments of the present disclosure, the uplink SPS release can be informed to the communication device either implicitly through the normal dynamic scheduling DCI message or explicitly through the specific SPS release DCI message. As such, the embodiments of the present disclosure can support uplink SPS release and uplink dynamic scheduling simultaneously, which avoids potential service interruption. In one or more embodiments of the present disclosure, the communication device may implicitly acknowledge the uplink SPS release based on the PUCCH position of a HARQ feedback, which thereby implements more accurate and quicker acknowledgement of uplink SPS release.

In general, the various exemplary embodiments may be implemented in hardware or special purpose circuits, software, logical or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block and signaling diagrams, it is well understood that these blocks, apparatus, systems, techniques or methods described herein may be implemented in, as non-limiting examples, hardware, software, firmware, special purpose circuits or logical, general purpose hardware or controller or other computing devices, or some combination thereof.

As such, it should be appreciated that at least some aspects of the exemplary embodiments of the disclosure may be practiced in various components such as integrated circuit chips and modules. As well known in the art, the design of integrated circuits is by and large a highly automated process.

The present disclosure may also be embodied in the computer program product which comprises all features capable of implementing the method as depicted herein and may implement the method when loaded to the computer system.

The present disclosure has been specifically illustrated and explained with reference to the preferred embodiments. The skilled in the art should understand various changes thereto in form and details may be made without departing from the spirit and scope of the present disclosure.

What is claimed is:

1. A method for operating a network node device, comprising:

determining whether or not there is a dynamically scheduled uplink transmission for a communication device in an uplink sub-frame where the communication device needs to perform an uplink SPS, Semi-Persistent Scheduling, release;

sending to the communication device, in response to determining that there is a dynamically scheduled uplink transmission for the communication device in the uplink sub-frame where the communication device needs to perform an uplink SPS release, a dynamic scheduling DCI, Downlink Control Indication, message for the dynamically scheduled uplink transmission, wherein at least one field of the dynamic scheduling DCI message is configured in a manner that the dynamic scheduling DCI message implicitly indicates the uplink SPS release;

sending to the communication device, in response to determining that there is no dynamically scheduled uplink transmission for the communication device in the uplink sub-frame where the communication device needs to perform an uplink SPS release, an uplink SPS release DCI message to explicitly indicate the uplink SPS release; and determining an uplink SPS release state of the communication device based on whether a HARQ, Hybrid Automatic Repeat Request, feedback from the communication device is carried on a PUCCH, Physical Uplink Control Channel, resource position, which is configured to implicitly indicate to the network node device an uplink SPS release acknowledgement, wherein the PUCCH resource position carrying the HARQ feedback of the communication device is calculated based on a lowest index of CCEs, Control Channel Elements carrying the uplink SPS release DCI message.

2. The method according to claim 1, wherein the at least one field of the dynamic scheduling DCI message includes a field of the dynamic scheduling DCI message specifying a cycle shift for demodulation reference signal.

3. The method according to claim 2, wherein in case that the dynamic scheduling DCI message is sent to implicitly indicate the uplink SPS release, the method further comprises determining the uplink SPS release state of the communication device based on whether corresponding PUSCH, Physical Uplink Shared Channel, data of the communication device are decoded successfully or not by using the cycle shift for demodulation reference signal specified by the field of the dynamic scheduling DCI message.

4. The method according to claim 1, wherein in case that the HARQ feedback is received in an uplink sub-frame together with a scheduling request of the communication device, the PUCCH resource position carrying the HARQ feedback of the communication device is allocated on an idle PUCCH resource position.

5. The method according to claim 4, wherein the idle PUCCH resource position is defined by an unused Walsh code for any ZC sequence cycle shift to indicate uplink SPS release acknowledgement together with the scheduling request.

6. The method according to claim 4, wherein the uplink SPS release DCI message includes information associated with the idle PUCCH resource position which is used to implicitly indicate the uplink SPS release acknowledgement together with the scheduling request.

7. The method according to claim 1, wherein in case that the HARQ feedback is received in an uplink sub-frame together with a scheduling request of the communication device, the scheduling request of the communication device is modulated onto a demodulation reference signal symbol at a predetermined slot of the PUCCH.

8. A method for operating a communication device, comprising:

receiving from a network node device a dynamic scheduling DCI message for the normal dynamic uplink transmission at a same uplink sub-frame as uplink SPS transmission, wherein at least one field of the dynamic scheduling DCI message is configured in a manner that the dynamic scheduling DCI implicitly indicates an uplink SPS release; or receiving from the network node device an uplink SPS release DCI message to explicitly indicate the uplink SPS release; and implicitly indicating to the network node device an uplink SPS release acknowledgement based on a PUCCH resource position carrying a HARQ feedback of the communication device, wherein in case that the HARQ feedback is transmitted in an uplink sub-frame together with a scheduling request of the communication device, the PUCCH resource position carrying the HARQ feedback of the communication device is allocated on an idle PUCCH resource position.

9. The method according to claim 8, wherein the at least one field of the dynamic scheduling DCI message includes a field of the dynamic scheduling DCI message specifying a cycle shift for demodulation reference signal.

10. The method according to claim 9, wherein in case that the dynamic scheduling DCI message is received to implicitly indicate the uplink SPS release, the method further comprises transmitting corresponding PUSCH, Physical Uplink Shared Channel, data to the network node device by using the cycle shift for demodulation reference signal specified by the field of the dynamic scheduling DCI message to indicate an uplink SPS release acknowledgement.

11. The method according to any of claim 8, wherein the PUCCH resource position carrying the HARQ feedback of the communication device is calculated based on based on a lowest index of CCEs carrying the uplink SPS release DCI message.

12. The method according to claim 8, wherein the idle PUCCH resource position is defined by an unused Walsh code for any ZC sequence cycle shift to indicate uplink SPS release acknowledgement together with the scheduling request.

13. The method according to claim 8, wherein the uplink SPS release DCI message includes information associated with the idle PUCCH resource position which is used to implicitly indicate the uplink SPS release acknowledgement together with the scheduling request.

14. The method according to claim 8, wherein in case that the HARQ feedback is transmitted in an uplink sub-frame together with a scheduling request of the communication device, the scheduling request of the communication device is modulated onto a demodulation reference signal symbol at a predetermined slot of the PUCCH.

15. A network node device, comprising one or more processors operable to:

determine whether or not there is a dynamically scheduled uplink transmission for a communication device in an uplink sub-frame where the communication device needs to perform an uplink SPS release; and send to the communication device, in response to determining that there is a dynamically scheduled uplink transmission for the communication device in the uplink sub-frame where the communication device needs to perform an uplink SPS release, a dynamic scheduling DCI message for the dynamically scheduled uplink transmission, wherein at least one field of the dynamic scheduling DCI message is configured in a manner that the dynamic scheduling DCI implicitly indicates the uplink SPS release;

send to the communication device, in response to determining that there is no dynamically scheduled uplink transmission for the communication device in the uplink sub-frame where the communication device needs to perform an uplink SPS release, an uplink SPS release DCI message to explicitly indicate the uplink SPS release; and determine an uplink SPS release state of the communication device based on whether a HARQ, Hybrid Automatic Repeat Request, feedback from the communication device is carried on a PUCCH, Physical Uplink Control Channel, resource position, which is configured to implicitly indicate to the network node device an uplink SPS release acknowledgement, wherein the PUCCH resource position carrying the HARQ feedback of the communication device is calculated based on a lowest index of CCEs, Control Channel Elements carrying the uplink SPS release DCI message.

* * * * *